United States Patent [19]

Zion

[11] 4,452,314

[45] Jun. 5, 1984

[54] METHOD OF INSTALLING A REINFORCED THERMOSETTING RESIN SUCKER ROD ASSEMBLY COMPOSED OF PULTRUDED ARCUATE SECTIONS

[75] Inventor: Earl M. Zion, Newark, Ohio

[73] Assignee: Owens-Corning Fiberglas Corporation, Toledo, Ohio

[21] Appl. No.: 369,442

[22] Filed: Apr. 19, 1982

[51] Int. Cl.³ .............................................. E21B 17/00
[52] U.S. Cl. ............................ 166/378; 166/385; 156/294; 156/304.2; 156/304.5; 29/463
[58] Field of Search ................. 29/463; 52/309.1, 726; 138/162, 166; 156/294, 304.2, 304.5; 166/77, 378, 379, 385; 175/103; 405/155

[56] References Cited

U.S. PATENT DOCUMENTS

| | | | |
|---|---|---|---|
| 1,303,687 | 5/1919 | Leffler | 156/304.5 |
| 3,034,566 | 5/1962 | McKay | 156/180 |
| 3,116,781 | 1/1964 | Rugeley et al. | 175/103 |
| 3,126,035 | 3/1964 | Espetvedt | 138/162 |
| 3,889,579 | 6/1975 | Wiechowski et al. | 417/545 |
| 4,195,691 | 4/1980 | Newling | 166/378 |
| 4,205,926 | 6/1980 | Carlson | 403/266 |
| 4,298,554 | 11/1981 | Vogel et al. | 138/166 |

FOREIGN PATENT DOCUMENTS

| | | | |
|---|---|---|---|
| 49278 | 4/1977 | Japan | 156/294 |
| 2032333 | 5/1980 | United Kingdom | 156/294 |

*Primary Examiner*—Stephen J. Novosad
*Assistant Examiner*—William P. Neuder
*Attorney, Agent, or Firm*—Ronald C. Hudgens; Greg Dziegielewski; Paul J. Rose

[57] ABSTRACT

Pultruded reinforced thermosetting resin arcuate sections are wound respectively on spools, the spools are transported to a well site, and the arcuate sections are unwound from the spools and assembled into a sucker rod.

3 Claims, 9 Drawing Figures

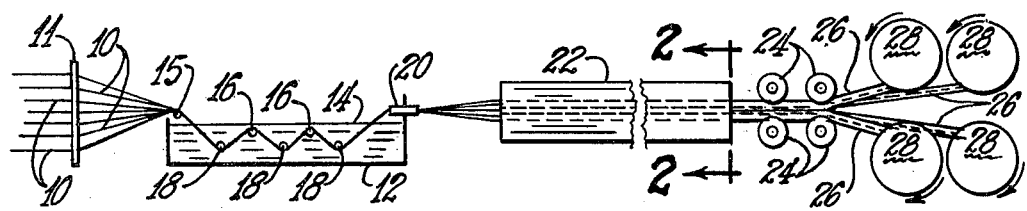
FIG. 1
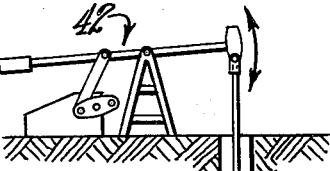
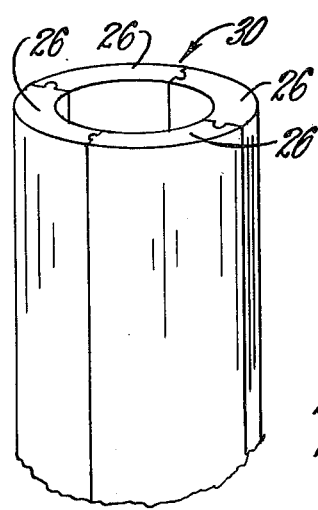
FIG. 3
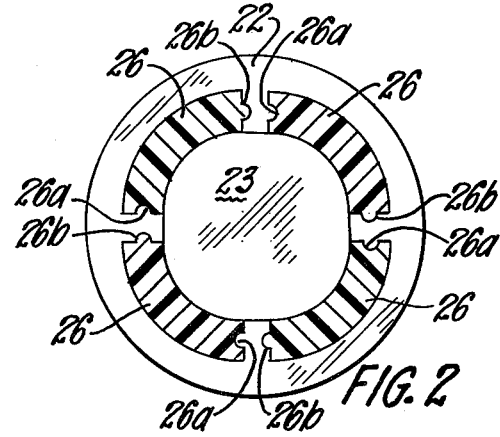
FIG. 2
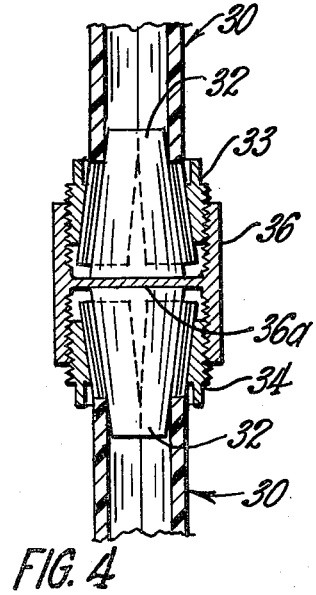
FIG. 4   FIG. 4A
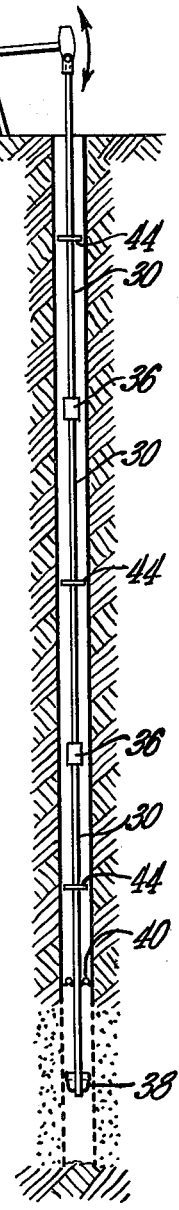
FIG. 5

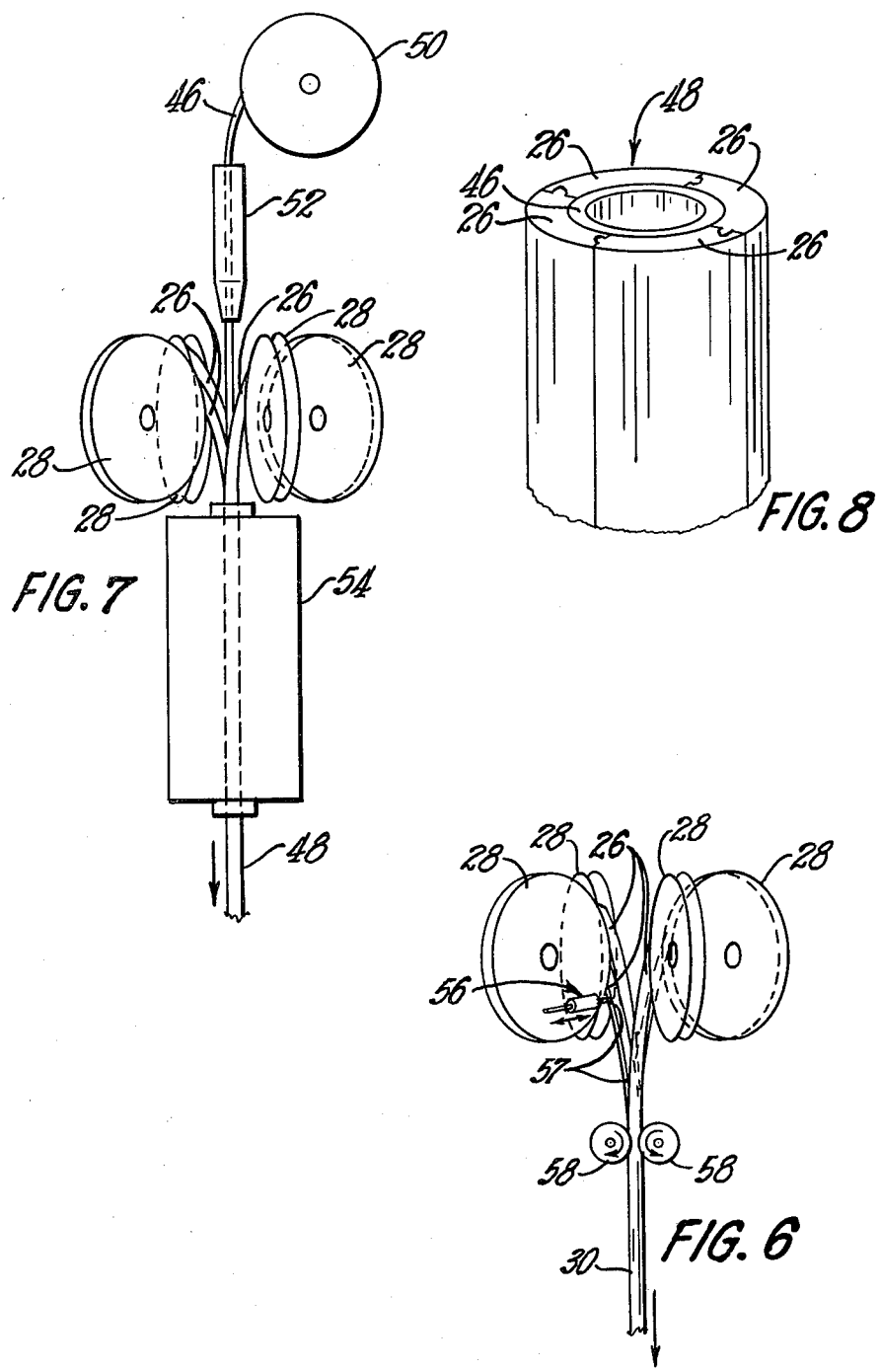

METHOD OF INSTALLING A REINFORCED THERMOSETTING RESIN SUCKER ROD ASSEMBLY COMPOSED OF PULTRUDED ARCUATE SECTIONS

TECHNICAL FIELD

This invention relates generally to sucker rods for use in pumping liquids from wells, and more particularly to reinforced plastic sucker rods.

BACKGROUND ART

U.S. Pat. Nos. 3,212,582, 3,234,723, 3,486,557 and 4,205,926 disclose sucker rods with metal wires or cables encased in plastic. U.S. Pat. No. 4,024,913 discloses a sucker rod with synthetic polymer fibrous rovings encased in plastic. U.S. Pat. No. 3,034,566 discloses apparatus for making glass fiber reinforced plastic rods. U.S. Pat. No. 3,889,579 discloses glass fiber reinforced plastic sucker rods, both solid and hollow. In column 4, the desirability of semi-rigidity for the sucker rods is disclosed, the capability of being bent being limited to a radius of curvature of as great as 15 or 20 feet, and typically greater than 6.5 or 7 feet. This results in "very large reels" (col. 4, line 23) when the rod is wound. Such very large reels are difficult to handle and transport.

DISCLOSURE OF INVENTION

In accordance with the invention, reinforced plastic sucker rod assembly is formed from a plurality of arcuate sections. The plastic may be a polyester, vinyl ester, or epoxy resin and the arcuate sections may thus be relatively rigid. However, because of its shape, each arcuate section can be wound on a much smaller reel or spool than can a one-piece sucker rod with a diameter equivalent to that of the assembly. In the embodiment shown, four ninety-degree arcuate sections are provided in the assembly, and each arcuate section is capable of being bent to a radius of curvature of about two feet. This results in much smaller reels of wound sections, easier to handle and transport.

BRIEF DESCRIPTION OF DRAWINGS

The invention is more specifically described hereinafter with reference to the accompanying drawings in which:

FIG. 1 is a schematic elevational view of apparatus for making and winding arcuate sections for the reinforced plastic sucker rod assembly of the invention;

FIg. 2 is an enlarged sectional view taken along the line 2—2 of FIG. 1;

FIG. 3 is a fragmentary perspective view of an end portion of a sucker rod assembly constructed in accordance with one embodiment of the invention, before the application of an end fitting;

FIG. 4 is a fragmentary longitudinal sectional view of a joint structure between two lengths of sucker rod constructed in accordance with the invention;

FIG. 4A is a view similar to FIG. 4, but showing a preferred embodiment of a coupling in the joint structure;

FIG. 5 is a schematic vertical sectional view of a well illustrating the use of a sucker rod assembly constructed in accordance with the invention;

FIG. 6 is a fragmentary schematic perspective view illustrating field assembly of arcuate sections into sucker rod immediately before installation thereof in a well; and FIGS. 7 and 8 are views respectively similar to FIGS. 6 and 3, but illustrating another embodiment of the invention.

BEST MODE OF CARRYING OUT THE INVENTION

With reference to the drawings, FIG. 1 shows a plurality of strands 10 preferably of glass filaments being drawn from a supply creel (not shown) through resin impregnating apparatus including an eyelet board 11 and a container 12 having liquid thermosetting resin 14 therein. Other reinforcing material besides glass fibers may be used. The strands 10 are drawn over a guide rod 15 and then alternatively under a plurality of lower rods 18 and over a plurality of upper rods 16, the rods 16 and 18 being beneath the surface of the resin 14, and then through a wiping die 20 which wipes excess resin off the impregnated strands 10 for return thereof to the container 12. From the wiping die 20 the impregnated strands 10 pass through an outer die 22 and along an inner die 23 (FIG. 2), the dies 22 and 23 comprising heated forming and curing means. In the embodiment shown, the impregnated strands 10 are pulled through the dies 22 and 23 by sets of pull rolls 24 and emerge as four cured ninety-degree arcuate sections 26 which are wound respectively on four spools 28. The die set 22, 23 may be of a different configuration and the number of arcuate sections 26 may be more or less than four. Each arcuate section 26 can be wound on a spool of smaller radius than can a one-piece rod of a diameter equal to the diameter of a rod formed by four of the arcuate sections in assembly. The spools 28 can thus be smaller and easier to handle, transport, and use than the "very large reels" of the prior art.

After the wound spools 28 are transported to a site for use, arcuate sections 26 from the spools may be assembled into a sucker rod assembly 30, as shown in FIG. 3. Preferably, each arcuate section 26 is provided with a longitudinal groove 26a in one of its radial longitudinal surfaces and with a longitudinal tongue 26b on the other of its radial longitudinal surfaces, as best shown in FIG. 2. When the arcuate sections are assembled, each tongue 26b on one section cooperates with a groove 26a in an adjacent section for better retention of the sections in proper position in the assembly 30. If desired, hot-melt adhesive may be applied intermittently to the radial longitudinal surfaces, as explained with reference to FIG. 6, before assembly of the arcuate section 26.

FIG. 4 shows a joint structure for two of the assembled sucker rods 30, including a pair of tapered plugs 32, a pair of internally tapered externally threaded nipples 33 and 34, and an internally threaded coupling 36 having a central plug stop wall 36a. The nipples 33 and 34 are threaded in opposite directions, as are the corresponding opposite end portions of the coupling 36.

FIG. 4A shows a preferred embodiment of the joint structure of FIG. 4 wherein the coupling 36 has been replaced by a pair of identical cup-like nuts 36b rotatably mounted on a build-up spool 37.

FIG. 5 schematically shows the use of sucker rod assemblies 30 in a well. Three sucker rod assemblies 30 connected serially by two couplings 36 are shown along with a pumping cup 38, a check valve 40, driving means 42 for vertically reciprocating the string of sucker rod assemblies 30 and the pumping cup 38, and centering or guide collars 44 on the sucker rod assemblies.

FIG. 8 shows a plurality of the arcuate sections 26 along with thermoplastic tubing 46 assembled into a sucker rod 48. FIG. 7 schematically illustrates a process of making such an assembly at a well site for installation directly into the well. The thermoplastic tubing 46 is fed from a spool 50 through a suitable heater 52. Heated conveyor mold apparatus 54 of conventional construction gathers the arcuate sections 26 from the four spools 28 and forms the sucker rod 48 for disposition directly from the well. Upon cooling, the arcuate sections 26 become bonded to the tubing 46. Joints such as shown in FIG. 4 or FIG. 4A are provided when necessary.

FIG. 6 schematically illustrates a preferred process for assembling arcuate sections 26 into a sucker rod, such as the sucker rod 30 of FIG. 3, at a well site for installation directly into the well. Hot-melt adhesive applicators 56, only one being shown, intermittently apply hot-melt adhesive 57 to the radical longitudinal surfaces of the arcuate sections 26 before they are gathered into the sucker rod 30 by a set of pull rolls 58.

Various modifications may be made in the structure shown and described without departing from the spirit and scope of the invention.

I claim:

1. A method of installing sucker rod in a well comprising providing a plurality of spools each having a length of a pultruded reinforced thermosetting resin arcuate section wound thereon, assembling the arcuate sections into a rod by pulling them together from the spools with a pulling and assembling apparatus, and depositing the rod from the pulling and assembling apparatus down a well.

2. A method as claimed in claim 1 including applying hot-melt adhesive between each pair of adjacent arcuate sections before the arcuate sections are assembled into the rod.

3. A method as claimed in claim 1 including providing a spool having a length of thermoplastic tubing wound thereon, assembling the arcuate sections around the tubing by pulling the tubing from its spool along with the pulling of the arcuate sections respectively from their spools by the pulling and assembling apparatus, and heating the tubing before its assembly with the arcuate sections.

* * * * *